Jan. 29, 1935.  F. J. HULL  1,989,451

LUBRICATING DEVICE

Filed March 9, 1928

Inventor
Foster J. Hull
By H. H. Snelling
Attorney

Patented Jan. 29, 1935

1,989,451

UNITED STATES PATENT OFFICE 1,989,451

LUBRICATING DEVICE

Foster J. Hull, Hagerstown, Md., assignor to Henry H. Snelling, Washington, D. C.

Application March 9, 1928, Serial No. 260,399

14 Claims. (Cl. 184—45)

This invention relates to lubricators of the grease cup type from which the lubricant is ejected to a bearing by means of a spring operated piston which forces the lubricant through the discharge passage past a valve arranged to control the rate of flow of the lubricant. In this lubricator the piston is provided with an extension the end of which projects out of the body of the grease cup and provides an indicator as to the amount of lubricant the cup contains, and the control valve is mounted on a threaded extension on the opposite side of the piston and may be adjusted to permit more or less lubricant to pass it by rotating the piston with respect to the valve to change the position of the valve in the discharge passage.

According to the present improvements the indicator provided by the extension on the piston is entirely enclosed in a casing so as to keep dirt from entering the lubricator and thereby prevent grit from wedging between the parts and checking the operation of the grease piston as might readily occur in case the lubricator without such a casing was installed for example on a sand blast machine. The casing is provided with a glass tube surrounding the indicator extension on the piston so that it will be possible to determine when to refill the lubricator by observing the position of the extension. The lubricator is also provided with a visible gage for indicating the position of the feed controlling valve with respect to the grease piston whereby it may be adjusted for a definite control of the flow of lubricant to the bearing which is to be lubricated.

The lubricator is provided with attachments for connecting refilling devices thereto such as the ordinary grease-guns or a common system for refilling a plurality of such grease cups is provided to which a grease-gun is attached. In order to prevent an excessive pressure in any one of the cups which might occur during the filling of a plurality of cups, the extension on the grease piston of each lubricator upon which the control valve is mounted is also provided with a valve member which operates to shut off the flow of lubricant to each of the grease cups successively as they are filled with the right amount of lubricant without interfering with other cups which have not been completely filled. These valve members are so arranged that they will not interefere with the flow of lubricant through the discharge passages of the lubricators at any time.

Further features and details of the invention will hereinafter appear.

In the drawing:—

Figure 1:
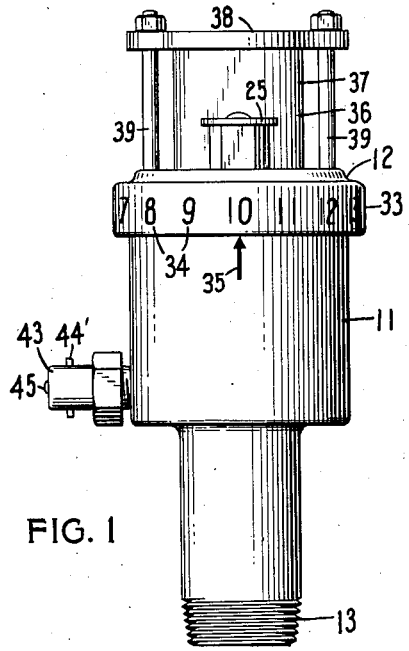
Figure 1 is a side elevation view of a lubriactor in accordance with this invention.

Referring to the drawing the body of the lubricator comprises a cylindrical cup 11 provided with a rotatable cover 12 and a threaded boss 13 having a discharge passage 14 therethru. The cup provides a chamber for lubricant at 15 between the discharge passage and a piston 16 mounted to reciprocate within the cup according to the amount of lubricant therein.

The piston 16 consists of a circular metal disk 17 to which a cup leather 18 may be suitably secured by means of a ring 19 and fastening members such as screws 20 extending therethru into the disk 17. The piston 16 is guided in the cup by means of extensions 21 and 22 on the upper and lower sides respectively of the disk 17,—extension 21 being of a polygonal cross section and passing thru an aperture of the same shape in cover 12. Extension 22 has a threaded portion or worm 23 upon which is mounted a control valve 24. Extension 21 is provided with a flange 25 in the form of a disk secured to its end which is adapted to engage the cover 12 before the leather cup 18 reaches the bottom of the lubricator and extension 22 is provided with a member 26 to prevent the control valve 24 from being screewd off the worm 23. A compression spring 27 is positioned between the cover 12 and disk 17 to force the piston 16 downwardly into the cup for ejecting the lubricant into the bearing.

The cover 12 is rotatably secured on the cup 11 by means of a ring 28 which cooperates with annular grooves in the cup and cover in a manner to keep the cover from readily coming off and prevent the entrance of dirt into the cup. In the upper portion of the cup is a spring 29, one end of which is provided with a detent 31 that projects through an aperture in the cup and is adapted to engage with any one of a series of depressions 30 in the interior of the flange 33 of the cover. On the exterior of the flange 33 are a series of numerals 34 corresponding to the depressions 30 and the lubricator cup 11 is provided with an index arrow 35 whereby the angular position of the cover 12 with respect to the cup may be determined and consequently the adjustment of the feeding of the lubricant by the control valve 24 may be gaged since the piston 16 is caused to turn with the cover 12, and the worm 23, thereby moves the control piston with respect to the plunger.

In order to prevent a possible entry of dirt thru the cover 12 where the extension 21 passes thru it, a casing 36 is arranged to enclose the outer end of the extension 21. The position of the piston is indicated by the position of the end of the extension 21 in the casing 36 as its side walls consist of transparent material such as a glass tube 37 which is secured between the cover 12 and an end plate 38 by means of bolts 39 extending thru the plate 38 and into the cover 12. The bolts 39 also protect the glass tube 37 to a great extent as will readily be observed.

Figure 2:
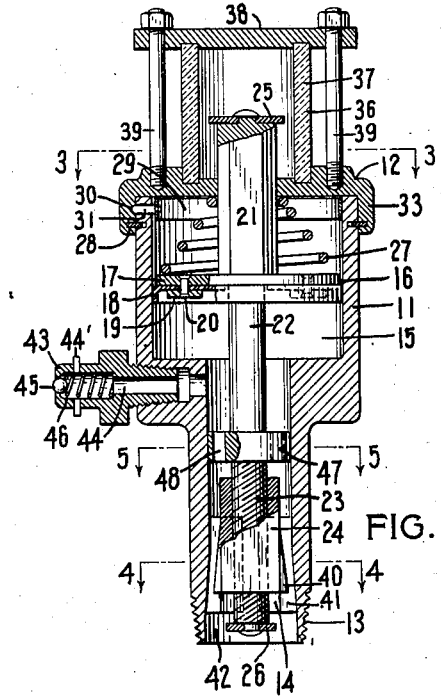
Figure 2 is a vertical sectional view of the lubricator shown in Figure 1.
Figure 3:
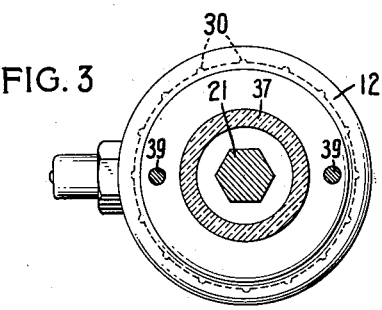
Figure 3 is a cross-sectional view taken on line 3—3 of Figure 2.
Figure 4:
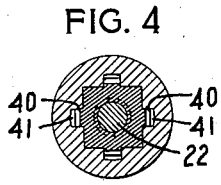
Figure 4 is a cross-sectional view taken on line 4—4 of Figure 2.
Figure 5:
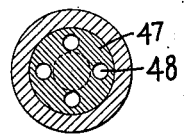
Figure 5 is a cross-sectional view taken on line 5—5 of Figure 2.

In order to move the control valve 24 with respect to the piston a plurality of wings 40 extend from its sides into grooves 41 in the passage 14 which prevent the control valve 24 from turning when the piston 16 is turned by rotation of the cover 12. Figure 2 represents the parts in the position they are in when the cup is half full of lubricant. As the lubricant is ejected from the cup the piston 16, together with all the parts connected therewith, are forced downwardly by the spring 27 and gradually the piston is lowered until its lower end extends into the enlarged lower portion 42 of the passage 14. It will be noted that the wings 40 are tapered so that when they pass into the enlarged portion 42 of the passage, a larger passageway is provided which gradually increases as the plunger approaches its lowermost position. This compensates for the weakening of the compression spring 27 as it expands and the adjustment for a greater or lesser volume of grease or for difference of flow potential of different grades of lubricating grease may be made by turning the cover 12 as hereinbefore explained.

In order to fill the lubricator a nipple 43 having suitable securing projections 44' for a grease gun is mounted in an inlet passage 44 in the bottom of cup 12. A ball valve 45 is pressed by a spring 46 normally to close the outer end of the nipple 43 to prevent lubricant from coming out thru this nipple.

Mounted on the extension 22 is a valve member 47 which reciprocates with the extension in the outlet passage and when in its upper position closes the inlet passage 44 thereby limiting the amount of lubricant which may be forced into the cup at one filling. This valve is provided with one or more apertures 48 providing passageways for lubricant between the cup and the bearing at all times but the valve 47 prevents lubricant from being forced rapidly into the bearing by means of the gun filling the cups.

Figure 6:
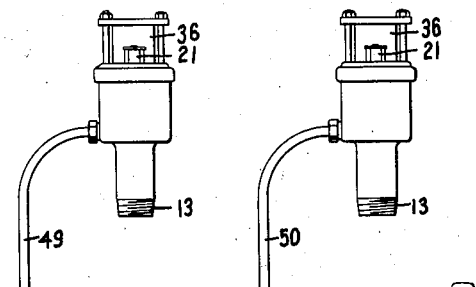
Figure 6 is a diagrammatic view of a filling system for a plurality of lubricators in accordance with this invention.

In Figure 6 two lubricators, in accordance with this invention, are shown connected by pipes 49 and 50 with a conduit 51 for simultaneous filling by means of a grease gun or filler 52 connected therewith. Any number of such lubricators may be so connected for simultaneous filling from the conduit in which case the ball check valve 45 will not be necessary except at the connection 53 for the filler 52. As each of the lubricator cups connected with the conduit 51 is filled its valve member 47 closes its inlet and permits the operation of the filler 52 to proceed until the lubricators are all full as will be indicated by the position of the extensions 21 in the casings 36. The substantial closing of the lubricators by valve members 24 and 47 as they are filled effects a material saving of lubricant especially in the event of a loose fitting bearing through which the lubricant might be forced and also insures a more even filling of all the connected lubricators.

Obvious changes in details and proportions of various parts may be resorted to within the scope of the invention.

What I claim is:

1. In a lubricating device, a grease cup having a discharge passage, a removable piston reciprocable within the cup, pressure means operative upon said piston to force lubricant thru the discharge passage, and a control valve reciprocably mounted in the discharge passage and connected with said piston to be moved thereby as the piston reciprocates within the cup to increase the size of the discharge passage as the piston moves downwardly within the cup, means to move the control valve with respect to the piston when the latter is revolved and means for revolving said piston at will.

2. In a lubricating device, a grease cup having a discharge passage, a control valve within the discharge passage controlling the rate of discharge of the grease, a cover rotatably mounted on the cup and having an aperture therein, and a member extending thru the aperture in the cover to be rotated by movement of the cover for adjusting the position of the valve in the discharge passage of the cup.

3. In a lubricating device, a cup having a discharge passage, a spring pressed piston reciprocating in the cup to force lubricant thru the discharge passage, a valve in said discharge passage, a cover rotatably mounted on the cup and having an aperture therein, and a member extending from the piston to reciprocate thru the aperture in the cover and to be rotated by movement of the cover for adjusting the position of the valve in the discharge passage of the cup, said cover having a flange extending over the cup and provided with a series of depressions around its inner surface, a corresponding series of indicating characters on said flange, a spring operated detent for engaging the depressions, and an index on the cup cooperative with said indicating characters whereby the setting of the cup for adjusting of the control valve will be visibly shown.

4. In a lubricating device, a grease cup having filling and discharge passages in one end thereof, a piston reciprocable within the cup, pressure means operative upon said piston to force lubricant thru the discharge passage, and a valve movable with the piston to close only the filling passage when the cup is filled to the required amount.

5. In a lubricating device, a grease cup having a discharge passage, a piston in said cup, a control valve in the discharge passage, a spring urging the piston to force grease thru the discharge passage, means visible from a distance for indicating the relative rate of flow of the grease and means connecting said first means to said valve and piston to show the quantity of grease in the cup.

6. In a lubricating device, a grease cup having a discharge passage, a piston having an indicating stem, means completely enclosing the stem, and a control valve movable with the piston, said enclosing means being rotatable to adjust the position of the control valve with respect to the piston to alter the rate of flow of the grease.

7. In a lubricating device, a grease cup having a valved entrance passage and a discharge passage, a piston reciprocating in the cup to discharge grease thru the discharge opening, and a valve automatically closing communication between the inlet passage and the cup chamber when the cup is filled with lubricant while at the same time providing a restricted opening permitting the flow of grease from the cup chamber thru the discharge passage.

8. In a lubricating device, a chamber, a discharge passage, means for discharging lubricant from said chamber having a stem projecting into the discharge passage, a control valve adjustably mounted on the stem, an inlet extending radially into the discharge passage, and a collar on said stem and having openings therethru parallel to the axis of the stem and having a smooth peripheral surface to close the inlet opening.

9. A grease cup having an inlet opening and a discharge passage, a one-way valve closing the inlet opening, a piston in the cup having a stem extending into the discharge passage, means for moving the piston to discharge the lubricant from the cup, a valve movable with said stem to close the inlet opening, a control valve adjustable on the stem to govern the rate of discharge of the grease, means for holding the control valve against rotation, and means for rotating the stem while the device is in use.

10. In a grease cup having a grease expelling means, a discharge passage, and an inlet passage communicating therewith, a stem extending into the discharge passage, a perforated cylindrical disk having a smooth periphery and fitting the bore of the discharge passage, said disk being of such axial length as to close the entrance opening, and further means adjustably mounted with respect to the disk to govern the rate of flow of grease thru the discharge passage.

11. In a lubricating device having a main chamber, a discharge passage in communication therewith for leading lubricant to a bearing to be lubricated and an entrance passageway whereby lubricating material may be forced into the chamber, a one-way valve for preventing passage of lubricant from the chamber thru the entrance passage, and means in the discharge passage for automatically closing only the entrance passage when the chamber is substantially full of lubricant.

12. The device of claim 11 in which the means is of less cross sectional area than the discharge passage so as to permit the flow of lubricant from the chamber to the bearing in any position of said means.

13. A grease cup having an outlet passage, a reservoir, and a valved intake or filling passage, said filling passage leading directly into said outlet passage means for discharging grease from the reservoir thru the outlet passage, and a valve closing communication between the intake and outlet passages when the reservoir is filled to a chosen extent.

14. In a lubricating device, a grease cup having a discharge passage and a filling passage terminating in said discharge passage, a one-way valve in the filling passage, a piston reciprocable in the cup, pressure means operative upon said piston to force lubricant thru the discharge passage, and a second valve operative in response to the position of the piston to close the filling passage when the cup is filled to the required amount.

FOSTER J. HULL.